United States Patent
Zhou et al.

(10) Patent No.: US 10,280,357 B2
(45) Date of Patent: May 7, 2019

(54) HIGH DENSITY AND HIGH TEMPERATURE EMULSIFIER FOR USE IN AN OIL BASED DRILLING FLUID SYSTEM

(71) Applicant: CNPC USA Corporation, Houston, TX (US)

(72) Inventors: Chun Zhou, Sugar Land, TX (US); Fuchen Liu, Panjin (CN); Zhenzhou Yang, Beijing (CN)

(73) Assignee: CNPC USA CORP., Houston, TX (US)

( * ) Notice: Subject to any disclaimer, the term of this patent is extended or adjusted under 35 U.S.C. 154(b) by 0 days.

(21) Appl. No.: 15/876,801

(22) Filed: Jan. 22, 2018

(65) Prior Publication Data

US 2018/0142134 A1  May 24, 2018

Related U.S. Application Data

(63) Continuation-in-part of application No. 14/883,388, filed on Oct. 14, 2015, now Pat. No. 9,909,050.

(51) Int. Cl.
  *C09K 8/34* (2006.01)
(52) U.S. Cl.
  CPC ....................................... *C09K 8/34* (2013.01)
(58) Field of Classification Search
  None
  See application file for complete search history.

(56) References Cited

U.S. PATENT DOCUMENTS

| | | | |
|---|---|---|---|
| 3,127,365 A | 3/1964 | Floyd | |
| 5,593,953 A | 1/1997 | Malchow, Jr. | |
| 6,620,770 B1 | 9/2003 | Kirsner | |
| 7,347,266 B2 | 3/2008 | Crews et al. | |
| 8,969,261 B2 | 3/2015 | Talingting et al. | |
| 2011/0016604 A1 | 1/2011 | Lim | |
| 2011/0223125 A1 | 9/2011 | Hough et al. | |
| 2015/0017587 A1 | 1/2015 | Okayasu et al. | |

OTHER PUBLICATIONS

Non-Final Office Action dated Jul. 12, 2017, in U.S. Appl. No. 14/883,388.
Notice of Allowance dated Dec. 19, 2017 in U.S. Appl. No. 14/883,388.
Notice of Allowance dated Nov. 14, 2017 in U.S. Appl. No. 14/883,388.

*Primary Examiner* — Jeffrey D Washville
(74) *Attorney, Agent, or Firm* — Ramey and Schwaller, LLP; William P. Ramey, III; Melissa D. Schwaller

(57) ABSTRACT

An emulsifying composition for an oil based drilling fluid includes oleyl alcohol and a mixture of polymeric amides. The polymeric amides can be 1,3-dihydroxypropan-2-yl (E)-12-hydroxyoctadec-9-enoate, (9E,9'E)-N,N'-(azanediyl-bis(ethane-2,1-diyl))bis(12-hydroxyoctadec-9-enamide, (E)-12-hydroxy-N,N-bis(2-((E)-12-hydroxyoctadec-9-enamido(ethyl)octadec-9-enamide, (Z)-4-(bis(2-((E)-12-hydroxyoctadec-9-enamido)ethy)amino)-4-oxobut-2-enoic acid, 1,3-dihydroxypropan-2-yl(Z)-4-(bis(2-((E)-12-hydroxyoctadec-9-enamido)ethy)amino)-4-oxobut-2-enoate, and N1,N1,N4,N4-tetrakis(2-((E)-12-hydroxyoctadec-9-enamido)ethyl)maleamide. The method of forming the emulsifying composition includes reacting a fatty oil with diethylenetriamine and then maleic acid, and adding oleyl alcohol. The high density emusifying composition is stable at high temperatures of drilling operations at greater depths in the wellbore.

7 Claims, 5 Drawing Sheets

FIG. 1

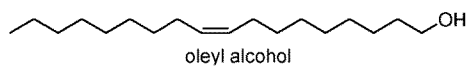
oleyl alcohol

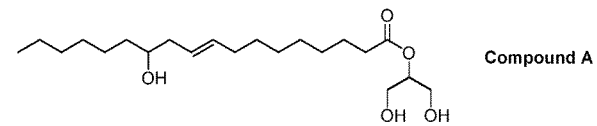
Compound A
1,3-dihydroxypropan-2-yl (E)-12-hydroxyoctadec-9-enoate

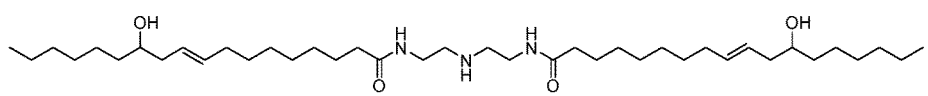
Compound B
(9E,9'E)-N,N'-(azanediylbis(ethane-2,1-diyl))bis(12-hydroxyoctadec-9-enamide)

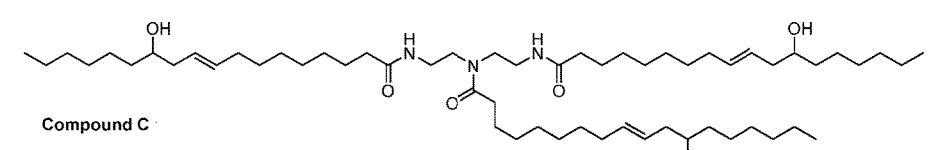
Compound C
(E)-12-hydroxy-N,N-bis(2-((E)-12-hydroxyoctadec-9-enamido)ethyl)octadec-9-enamide

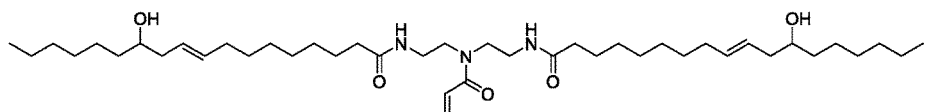
Compound D
(Z)-4-(bis(2-((E)-12-hydroxyoctadec-9-enamido)ethyl)amino)-4-oxobut-2-enoic acid

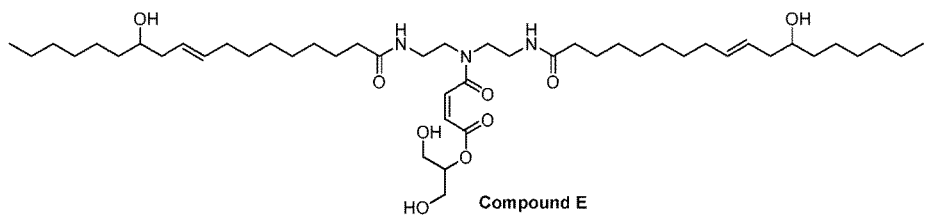
Compound E
1,3-dihydroxypropan-2-yl (Z)-4-(bis(2-((E)-12-hydroxyoctadec-9-enamido)ethyl)amino)-4-oxobut-2-enoate

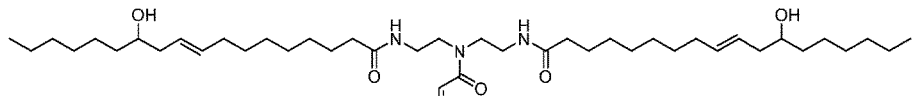
$N^1,N^1,N^4,N^4$-tetrakis(2-((E)-12-hydroxyoctadec-9-enamido)ethyl)maleamide
Compound F

HIGH DENSITY AND HIGH TEMPERATURE EMULSIFIER FOR USE IN AN OIL BASED DRILLING FLUID SYSTEM

RELATED APPLICATIONS

This application is a continuation-in-part application of U.S. patent application Ser. No. 14/883,388 filed on Oct. 14, 2015, which is specifically incorporated by reference in its entirety herein.

FIELD

The disclosure relates generally to fluid systems in the oil and gas industry, in particular, a drilling fluid or drilling mud system. The disclosure relates specifically to a drilling fluid system including an emulsifier that is stable under high density and high temperature conditions. The present invention also relates to a method of manufacturing the emulsifier from a fatty oil, diethylenetriamine, and maleic acid.

BACKGROUND

Fluid systems transport materials and chemicals and perform work, such as powering downhole tools with hydraulics, during drilling and production operations for oil and gas. Fracturing fluids are the fluids pumped into the wellbore with a proppant in order to fracture a rock formation. A high pressure injection of fracturing fluid at a target depth creates cracks in rock formation, and the fracturing fluid enters these cracks. The proppant, such as sand or other particulates, prevent the cracks from closing when the pressured injection of fluid stops. The fracture is held open by the proppant so that the formation remains permeable by oil, gas, salt water, and other fluids, which can now be pumped through the well. Drilling fluid, also known as drilling mud, lubricates and transports materials, during drilling operations. The drilling fluid is pumped from the surface, usually a mud pit, to the wellbore with additives, such as coolants and stabilizers. Drilling fluid carries drill cuttings from the wellbore to the surface, cools the drill bit, and provides hydrostatic pressure so that fluids from the rock formation do not enter the wellbore. Drilling fluids can also be used to suspend the drill cuttings in the drilling mud, when the drill bit stops. The pulverized rock at the drill bit can be suspended in the drilling mud and pumped back out of the borehole for removal. There can be other functions of drilling fluids, including hydraulic energy for downhole tools and pulse telemetry for transmitting information through the wellbore. Drilling fluids are selected for the particular work to be done by the fluid, conditions of the wellbore, and ability to limit corrosion and damage to the formation.

Categories of drilling fluids include water based muds, and oil based muds. Water based muds are free flowing, when being pumped. At rest, the water based mud gels in order to suspect drill cuttings and resist pumping. Additional pumping force is needed in order to break the gel and restart pumping in the free flowing condition. The water and clay are the basic components, and various additives can be included in the fluid system for viscosity, coolant, and lubrication control. Oil based mud contains a petroleum product, such as diesel fuel, as the free flowing fluid component. There is increased lubricity and less viscosity for these oil based fluid systems. Furthermore, the oil based drilling fluid systems withstand greater heat without degradation. There are additional environmental concerns and issues with analyzing the drill cuttings transported by oil based mud. The oil and water are the basic components, and various additives must be included in order to maintain the dispersion of water, as a contaminant, in the fluid. Emulsifiers, wetting agents, and gellants can be used to control stability, viscosity, coolant, and lubrication of an oil based drilling fluid system. Stability of the oil based drilling fluid systems relates to preventing the separation of the fluid into two layers, the oil and the water.

With advances in drilling to greater depths, wellbore conditions are more extreme. The drilling fluid systems must tolerate the more difficult conditions. Oil based drilling fluid systems are being used to withstand the high pressure and high temperature conditions at these greater depths. Water based drilling fluid systems do not work at the elevated pressures and temperatures of these more extreme wellbore conditions. With deeper wells, the need for oil based drilling fluid systems has expanded, and the demands for more stable oil based drilling fluid systems is greater.

The prior art discloses oil based drilling fluid systems with selected additives to control stability, viscosity, coolant, and lubrication.

U.S. Pat. No. 5,593,953, issued to Malchow Jr. on 14 Jan. 1997, identifies an oil based drilling fluid with a need to emulsify the brine or contaminated water in order to lower viscosity. The additive is specified as a friction modifier, and the particular chemical formula is provided. U.S. Pat. No. 8,969,261, issued to Talingting Pabalan et al. on 3 Mar. 2015, discloses ingredients of a composition for changing viscosity of a solution. The particular composition can be added to various solutions, not just drilling fluids to affect rheology of a solution.

However, the prior art references do not relate to the same material composition, and the prior art with similar ingredients are not related to the same drilling fluids. There is no disclosure of emulsifiers for drilling fluid systems in high density and high temperature conditions, and in particular emulsifiers with nitrogen based components with stability in the high density and high temperature conditions.

U.S. Pat. No. 6,620,770, issued to Kirsner et al. on 16 Sep. 2003, also identifies an oil based drilling fluid with an emulsifier based on polyamides, a nitrogen based component. The polyamides are one additive in a composition to emulsify the oil based drilling fluid, wherein the emulsifier is reacted before being added to the drilling fluid. The emulsifier is not related to high density and high temperature conditions. Furthermore, prior art also teaches against the use of nitrogen based emulsifiers in the high temperature conditions. US Patent Publication No. 2011/0166047, published on 7 Jul. 2011 for Patel et al. discloses a nitrogen-free emulsifying agent.

It is an object of the present invention to provide an oil based drilling fluid system for high density and high temperature conditions.

It is another object of the present invention to provide an oil based drilling fluid system for a temperature range of 150-260 degrees Celsius.

It is another object of the present invention to provide an oil based drilling fluid system for a density range of specific gravity (SG) range of 2.0-2.8.

It is another object of the present invention to provide an oil based drilling fluid system for deeper wells with wellbore conditions that require high density drilling fluids in high temperature conditions.

It is an object of the present invention to provide an oil based drilling fluid system having an emulsifier of nitrogen based components with stability at high density and high temperatures.

It is another object of the present invention to provide an oil based drilling fluid system having an emulsifier of a mixture of polymeric amides or polyamides.

It is still another object of the present invention to provide an oil based drilling fluid system having an emulsifier of a mixture of polyamides derived from a fatty oil, diethylenetriamine, and maleic acid.

It is an object of the present invention to provide a method of manufacturing an emulsifier of an oil based drilling fluid system derived from a fatty oil, diethylenetriamine, and maleic acid.

It is another object of the present invention to provide a method of manufacturing an emulsifier of a mixture of polyamides derived from a fatty oil, diethylenetriamine, and maleic acid.

It is an object of the present invention to provide an oil based drilling fluid system having a biologically friendly emulsifier.

It is another object of the present invention to provide an oil based drilling fluid system having an emulsifier with less risk of environmental contamination.

These and other objectives and advantages of the present invention will become apparent from a reading of the attached specification.

SUMMARY

Embodiments of the present invention include a high density emulsifying composition for an oil based drilling fluid used under high pressure and high temperature conditions of drilling operations in deep wellbores. The composition includes oleyl alcohol and a mixture of polymeric amides, also known as polyamides. The polymeric amides are formed by reacting a fatty oil with diethylenetriamine and then maleic acid. An oil based drilling fluid system can include the emulsifying composition, oil, viscosifier, weighting agent, and a fluid loss additive. The components and amounts of each component of the oil based drilling fluid system control stability, viscosity, coolant, and lubrication for the work and conditions of the wellbore. For example, an oil based drilling fluid system can include diesel oil and asphalt.

Embodiments of the present invention also include the method of forming the emulsifying composition by heating the fatty oil, adding diethylenetriamine for nitrogen purging, and holding a temperature between 80-120 degrees C., after nitrogen purging. A first reaction temperature is maintained at 130-170 degrees C. for one hour, and a second reaction is maintained temperature at 150-170 degrees C. for one hour. Then, the reactant is cooled to at least room temperature for the addition of maleic anhydride. A third reaction temperature is maintained between 80-120 degrees C. for one hour, a fourth reaction temperature is maintained, and a fifth reaction temperature is maintained greater than 200 degrees C. for one hour. Oleyl alcohol is then added so as to form the emulsifying composition for the oil based drilling fluid system.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

FIG. 1 is a schematic view of chemical structures of compounds in an embodiment of the emulsifying composition of the present invention.

Figure 2:
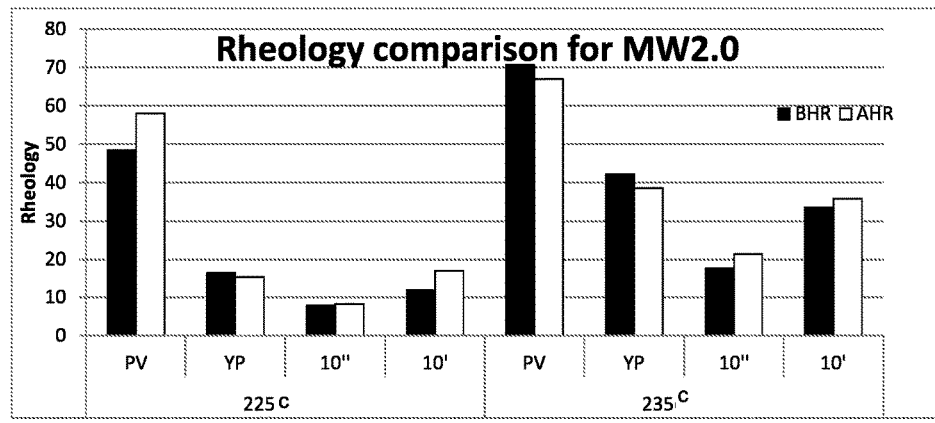
FIG. 2 is a graph, showing rheology, including plastic viscosity (PV), yield point (YP), 10" and 10' gel strength, at Before Hot Rolling (BHR) and After Hot Rolling (AHR), according to Table 1 with temperatures of 225 degrees C. and 235 degrees C.

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which:

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

Embodiments of the present invention include the method of manufacturing an emulsifier. The prior art establishes fatty acids as a conventional starting point. In particular, a tall oil fatty acid, such as oleic acid, is reacted with diethylenetriamine so as to form a mixture of fatty acid derivatives, such as fatty acid diamides. The mixture is the emulsion.

In the present invention, the method of forming an emulsifying composition for an oil based drilling fluid system includes heating a fatty oil to range of a range of 60-100 degrees C. for nitrogen purging. The fatty oil is a hydroxyl fatty oil, such as castor oil. Diethylenetriamine (DETA) is added, and the temperature of the reactants is held between 80-120 degrees C., after nitrogen purging. For the formation of the polyamide derivatives, a first reaction temperature is held at 130-170 degrees C. for one hour, then a second reaction temperature is held at 150-170 degrees C. for one hour. The reactants are cooled to at least room temperature, and maleic anhydride is added at room temperature. There is a third reaction temperature between 80-120 degrees C. for one hour, a fourth reaction temperature greater than 150 degrees C. for one hour, and a fifth reaction temperature greater than 200 degrees C. for one hour. Then, alcohol is added so as to form the emulsifier.

The alcohol added into the emulsifying composition may be any saturated or unsaturated, monohydroxylated or polyhydroxylated, branched or straight chain alcohol. This disclosure exemplifies oleyl alcohol as a suitable component of the emulsifying composition.

EXAMPLES

Example 1

280 g (0.3 mol) of castor oil is added to a 500 mL round bottom Flask with 4 necks, installed an agitation blade, a temperature probe, a distillation receiver with condenser and an additional funnel. The castor oil is heated to 70 degrees C. with agitation and a small nitrogen purge. When the temperature reaches 70 degrees C., the nitrogen purging is stopped. DETA is slowly added in the amount of 30 g, 0.29 mol (FW 103) with controlled temperature less than 120 degrees C. After DETA addition, reactants are heated to 150-160 degrees C. and held for 1 hour. The temperature is increased to 165 degrees C. and reacted for another 1 hour. The reactants are cooled to 70 degrees C., and 27 g of maleic acid (FW 98; 0.276 mol) are slowly added at 70 degrees C. The mixtures is cooked to 100 degrees C. and held for one hr, and then increased to 150 degrees C. and held for another one hour. Then, there is another increase to 200 degrees C. and holding for another one hour. After cooling, oleyl alcohol is added to dilute the mixture to produce a mixture with 80% activity.

In some embodiments, the fatty oil is a hydroxyl fatty oil, including castor oil. These fatty oils are more biologically friendly and pose less risk to the environment. The step of heating the fatty oil comprises heating within a range of 60-70 degrees C. In other alternative embodiments, the step of adding DETA includes adding at 90-110 degrees C.

Embodiments also include the step of maintaining the first reaction temperature at 150-160 degrees C. or at 155 C within 10-30 min after adding the diethylenetriamine. The sequence of the method further includes the step of maintaining the second reaction temperature within 10 minutes of the first reaction temperature. Further alternative embodiments of the method include the step of maintaining the third reaction temperature within 10-20 min after adding maleic anhydride. The method of forming the emulsifying composition can also include the step of adding 10-50 wt % of oleyl alcohol or diluting with an amount for 80% activity.

FIG. 1 shows a schematic view of the chemical structures identified in the emulsion of the present invention. Embodiments of the emulsifying composition for an oil based drilling fluid, includes oleyl alcohol, 1,3-dihydroxypropan-2-yl (E)-12-hydroxyoctadec-9-enoate as Compound A, (9E, 9'E)-N,N'-(azanediylbis(ethane-2,1-diyl))bis(12-hydroxyoctadec-9-enamide as Compound B, (E)-12-hydroxy-N,N-bis(2-((E)-12-hydroxyoctadec-9-enamido(ethyl) octadec-9-enamide as Compound C, (Z)-4-(bis(2-((E)-12-hydroxyoctadec-9-enamido)ethy)amino)-4-oxobut-2-enoic acid as Compound D, 1,3-dihydroxypropan-2-yl(Z)-4-(bis (2-((E)-12-hydroxyoctadec-9-enamido)ethy)amino)-4-oxobut-2-enoate as Compound E, and N1,N1,N4,N4-tetrakis(2-((E)-12-hydroxyoctadec-9-enamido)ethyl)maleamide as Compound F.

The emulsifier comprises a mixture of polyamides produced by reactions of a fatty oil with diethylenetriamine and then maleic acid. Embodiments include 10-50 wt % of oleyl alcohol, 10-50 wt % of Compound A, 5-30 wt % of Compound B, and 5-40 wt % of each of Compound C, Compound D, Compound E, and Compound F. The emulsifier remains stable at high temperatures and has the 80% activity. Alternative embodiments include an emulsifier with 20-30 wt % of oleyl alcohol, 10-30 wt % of Compound A, 5-10 wt % of Compound B, and 5-10 wt % of each of Compound C, Compound D, and Compound E, and 5-20 wt % of Compound F.

Example 2

The mixture of Example 1 includes 20 wt % of oleyl alcohol, 24 wt % of Compound A, 13 wt % of Compound B, and 10 wt % of each of Compound C, Compound D, Compound E, and Compound F.

Embodiments of the present invention also include the emulsifying composition used in an oil based drilling fluid system, such as drilling mud. The composition of the present invention stabilizes an invert emulsion oil based drilling fluid system with high density and at high temperatures. These drilling fluid systems with the emulsifier of the present invention can be used at greater depths in the wellbore, where such high temperature conditions are present in drilling operations.

An oil based drilling fluid system of the present invention can include oil, viscosifier, weighting agent, a fluid loss additive, and the emulsifying composition of the present invention as the emulsifier. In some embodiments, the oil based drilling fluid system has 50-100 wt % oil, 1-5 wt % viscosifier, 20-70 wt % weighting agent, 5-10 wt % fluid loss additive, and 0.3-3 wt % of the emulsifier of the present invention. The emulsifier is still produced by reactions of a fatty oil with diethylenetriamine and then maleic acid to form a mixture of polyamides and oleyl alcohol. Viscosifiers help to suspend drill cuttings in the fluid system. Fluid loss additives control losing drilling fluid to the rock formation of the wellbore. Weighting agents control density. High density drilling fluids can range to about 24 pounds per gallon for the particular high density drilling fluid of the present invention. Additional components, such as wetting agents to control surface tension can also be added. These additives to the base oil or petroleum product can be used to control stability, viscosity, coolant, and lubrication for conditions of a particular drilling operation.

An emulsifier or emulsifying composition stabilizes a drilling fluid by increasing kinetic stability. The emulsifier can increase viscosity to help to maintain the suspension of the dispersed phase in the drilling fluid. The rheology and electrical stability of the drilling fluid with an emulsifier can be measured to characterize the drilling fluid. The rheological profiles and electrical stability measurements show the present invention withstanding high density and high temperature conditions.

TABLE 1

| Rheology | MW 2.0 225 degrees C. | | MW 2.0 235 degrees C. | |
|---|---|---|---|---|
| | BHR | AHR | BHR | AHR |
| 600 | 112.1 | 131.6 | 183.4 | 171.7 |
| 300 | 64.8 | 73.4 | 116.9 | 104.2 |
| 200 | 48.1 | 53.2 | 89.8 | 79.8 |
| 100 | 29.7 | 31.3 | 59.2 | 51.6 |
| 6 | 7.1 | 7.1 | 20 | 18.7 |
| 3 | 5.8 | 5.9 | 18.7 | 17.6 |
| PV | 48.4 | 58 | 70.7 | 67 |
| YP | 16.5 | 15.4 | 42.2 | 38.6 |
| 10" | 7.8 | 8.2 | 17.7 | 21.5 |
| 10' | 11.9 | 17.1 | 33.6 | 35.8 |
| ES | 1035 | 1128 | 883 | 1034 |

Table 1 shows the Rheology and Electrical Stability of a drilling mud with emulsifier of the present invention aged at 225 degrees C. and 235 degrees C. The rheology and electrical stability were measured before hot rolling (BHR) and after hot rolling (AHR) at 150 degrees F. The examples of Table 1 used a mud weight (MW) of 2.0. The results of rheology are graphed in FIG. 2, and the results of electrical stability are graphed in FIG. 3.

Figure 3:
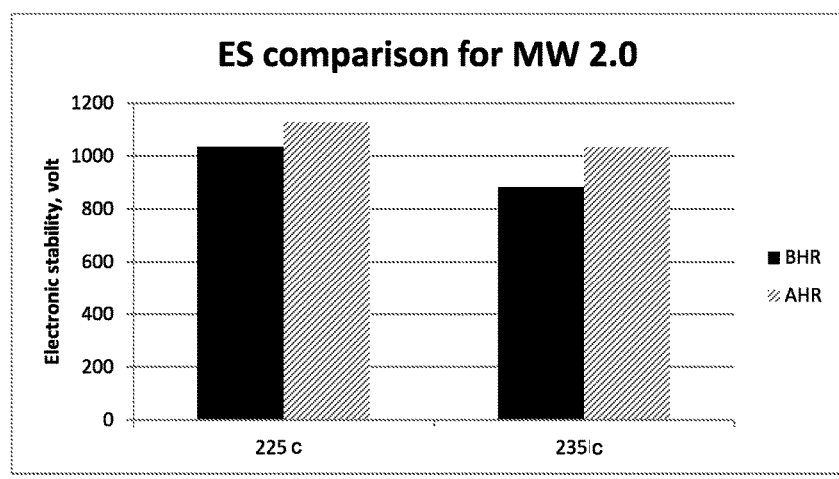
FIG. 3 is a graph, showing electrical stability, at Before Hot Rolling (BHR) and After Hot Rolling (AHR), according to Table 1 with temperatures of 225 degrees C. and 235 degrees C.

The properties of the drilling fluid are stable Before Hot Rolling treatment and After Hot Rolling treatment at the elevated temperatures. FIGS. 2 and 3 show that the drilling mud remained stable, even after the exposure to the high temperatures. The amount of change was very low, supporting the resiliency of the drilling mud with the emulsifier of the present invention at high temperature conditions.

TABLE 2

| Rheology | MW 2.2 PRIOR ART at 225 degrees C. | | | MW 2.2 PRESENT INVENTION at 225 degrees C. | | |
|---|---|---|---|---|---|---|
| | BHR | AHR | % change | BHR | AHR | % change |
| 600 | 103.2 | 115.6 | 12.02 | 147.8 | 147.4 | −0.27 |
| 300 | 62.7 | 60.7 | −3.19 | 86.7 | 83.3 | −3.92 |
| 200 | 48 | 43.3 | −9.79 | 64.7 | 61.7 | −4.64 |
| 100 | 31.8 | 25.3 | −20.44 | 40.8 | 38.7 | −5.15 |
| 6 | 12.2 | 5.1 | −58.20 | 12.8 | 13.1 | 2.34 |
| 3 | 10.8 | 4 | −62.96 | 11.3 | 11.4 | 0.88 |
| PV | 40.6 | 52.4 | 29.06 | 61.1 | 63.4 | 3.76 |
| YP | 21.9 | 7.5 | −69.75 | 25.5 | 20.1 | −21.18 |
| 10" | 11.8 | 6.4 | −45.76 | 12.8 | 17.8 | 39.06 |
| 10' | 13.2 | 12.7 | −3.79 | 17.4 | 29.6 | 70.11 |
| ES | 1859 | 635 | −65.83 | 1634 | 1117 | −31.64 |

Table 2 shows the Rheology and Electrical Stability of a drilling mud with emulsifier of the present invention aged at 225 degrees C. and a drilling mud with an emulsifier of the prior art at 225 degrees C. The prior art drilling fluid used an emulsifier from oleic acid, not castor oil of the present invention. The rheology and electrical stability were measured before hot rolling (BHR) and after hot rolling (AHR) at 150 degrees F. The examples of Table 2 used a mud weight (MW) of 2.2. The results of rheology are graphed in FIG. 4, and the results of electrical stability are graphed in FIG. 5.

Figure 4:
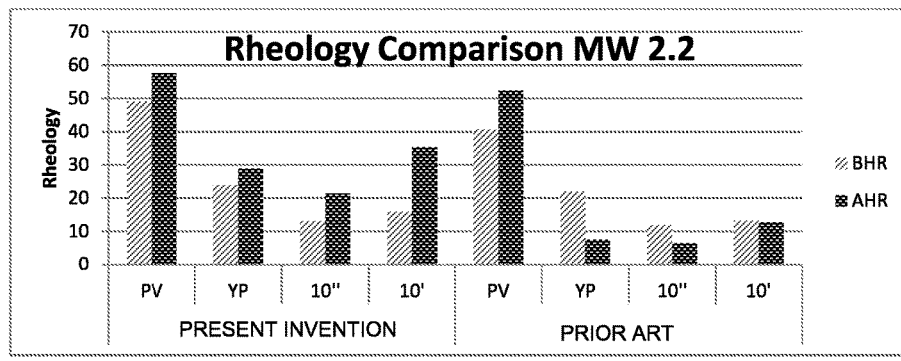
FIG. 4 is a graph, showing rheology, including plastic viscosity (PV), yield point (YP), 10" and 10' gel strength, at Before Hot Rolling (BHR) and After Hot Rolling (AHR), according to Table 2 for a drilling mud of the present invention and a drilling mud of the prior art at of 225 degrees C.
Figure 5:
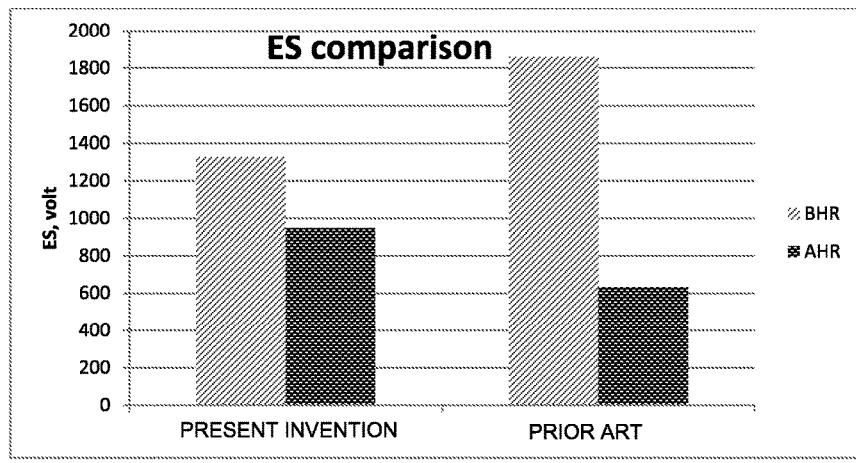
FIG. 5 is a graph, showing electrical stability, at Before Hot Rolling (BHR) and After Hot Rolling (AHR), according to Table 2 for a drilling mud of the present invention and a drilling mud of the prior art at of 225 degrees C.

The properties of the drilling fluid of the present invention are stable Before Hot Rolling treatment and After Hot Rolling treatment at the elevated temperature. FIGS. 4 and 5 show that the drilling mud remained stable, even after the exposure to the high temperatures. ES (electric stability) is the way to evaluate the emulsion stability in the invert emulsion drilling fluid. The higher number means a more stable emulsion. FIG. 4 shows the drilling mud of the present invention has a much more stable ES at BHR and AHR, which means the emulsifier of the present invention has a much better thermal stability. Additionally, the rheology is more stable. The plastic viscosity (PV) at BHR and AHR changes less than 5% in the present invention, while the prior art shows a change close to 30%. The results further support the stability of the fluid systems of the present invention, as in FIGS. 2 and 3, for the higher temperature and at a different higher mud weight.

TABLE 3

| Rheology | MW 2.2 225 degrees C. | | | MW 2.2 235 degrees C. | | |
|---|---|---|---|---|---|---|
| | BHR | AHR | % change | BHR | AHR | % change |
| 600 | 122.1 | 141.2 | 15.64 | 183.4 | 165.7 | −9.65 |
| 300 | 72.3 | 81.9 | 13.28 | 114.7 | 104.3 | −9.07 |
| 200 | 55.3 | 62.3 | 12.66 | 91 | 83.1 | −8.68 |
| 100 | 36.8 | 41.5 | 12.77 | 63.7 | 58.6 | −8.01 |
| 6 | 13.3 | 16.1 | 21.05 | 30.4 | 28.6 | −5.92 |
| 3 | 11.8 | 14 | 18.64 | 27.8 | 26.4 | −5.04 |
| PV | 49.1 | 57.6 | 17.31 | 69.5 | 65.2 | −6.19 |
| YP | 23.9 | 28.9 | 20.92 | 46 | 39.3 | −14.57 |
| 10" | 13 | 21.3 | 63.85 | 35.2 | 34.5 | −11.99 |
| 10' | 15.9 | 35.3 | 122.01 | 44.4 | 45 | 1.35 |
| ES | 1327 | 948 | −28.58 | 878 | 1029 | 17.20 |

Table 3 shows the Rheology and Electrical Stability of a drilling mud with emulsifier of the present invention aged at 225 degrees C. and 235 degrees C. The rheology and electrical stability were measured before hot rolling (BHR) and after hot rolling (AHR) at 150 degrees F. The examples of Table 3 used a mud weight (MW) of 2.2.

TABLE 4

| Rheology | MW 2.4 225 degrees C. | | | MW 2.4 235 degrees C. | | |
|---|---|---|---|---|---|---|
| | BHR | AHR | % change | BHR | AHR | % change |
| 600 | 117.5 | 119.9 | 2.04 | 133.8 | 135.3 | 1.12 |
| 300 | 64.7 | 67.4 | 4.17 | 78.9 | 77.3 | −2.03 |
| 200 | 48.5 | 49.5 | 2.06 | 60.3 | 57.9 | −3.98 |
| 100 | 31.4 | 30.4 | −3.18 | 39.4 | 36.5 | −7.36 |
| 6 | 11.3 | 9.2 | −18.58 | 14.1 | 12.5 | −11.35 |
| 3 | 10 | 8.2 | −18.00 | 13.2 | 11.4 | −13.64 |
| PV | 50.5 | 51.5 | 1.98 | 55.8 | 56.7 | 1.61 |
| YP | 15.2 | 15.7 | 3.29 | 24.2 | 20.4 | −15.70 |
| 10" | 11.8 | 10.5 | −11.02 | 17.1 | 16.1 | −5.85 |
| 10' | 15.5 | 17.3 | 11.61 | 27.4 | 26.4 | −3.65 |
| ES | 741 | 367 | −50.47 | 421 | 431 | 2.29 |

Table 4 shows the Rheology and Electrical Stability of a drilling mud with emulsifier of the present invention aged at 225 degrees C. and 235 degrees C. The rheology and electrical stability were measured before hot rolling (BHR) and after hot rolling (AHR) at 150 degrees F. The examples of Table 4 used a mud weight (MW) of 2.4. Hematite was used to increase the mud density. The results of rheology are graphed in FIG. 6, and the results of electrical stability are graphed in FIG. 7.

Figure 6:
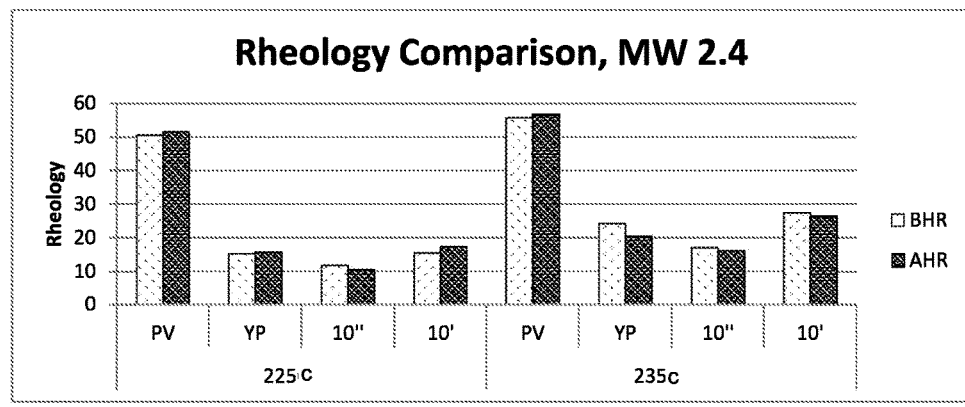
FIG. 6 is a graph, showing rheology, including plastic viscosity (PV), yield point (YP), 10" and 10' gel strength, at Before Hot Rolling (BHR) and After Hot Rolling (AHR), according to Table 4 with temperatures of 225 degrees C. and 235 degrees C. for drilling mud of the present invention at a different mud weight than Table 1 and FIG. 2.
Figure 7:
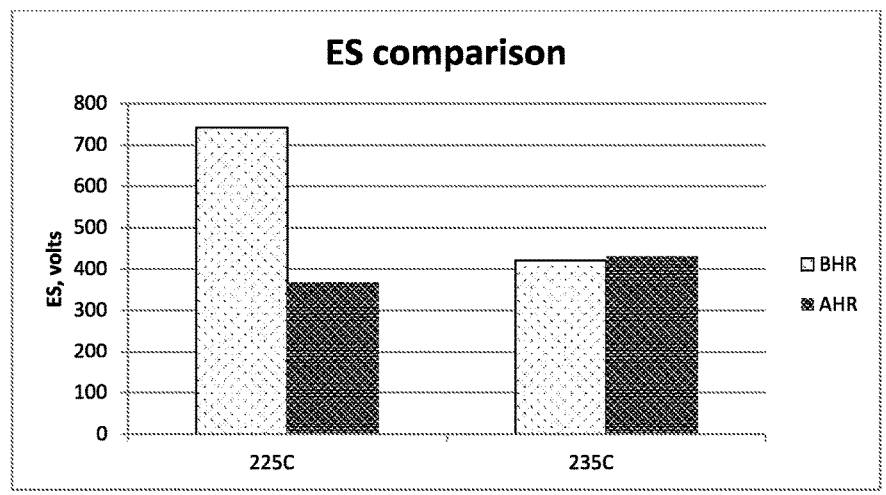
FIG. 7 is a graph, showing electrical stability, at Before Hot Rolling (BHR) and After Hot Rolling (AHR), according to Table 4 with temperatures of 225 degrees C. and 235 degrees C. for drilling mud of the present invention at a different mud weight than Table 1 and FIG. 3.

The properties of the drilling fluid are stable Before Hot Rolling treatment and After Hot Rolling treatment at the elevated temperatures and higher densities. FIGS. 6 and 7 show that the drilling mud remained stable, even after the exposure to the high temperatures and increase in mud weight. The amount of change was very low, supporting the resiliency of the high density drilling mud with the emulsifier of the present invention at high temperature conditions.

TABLE 5

| Rheology | MW 2.2 245 degrees C. | | |
| --- | --- | --- | --- |
|  | BHR | AHR | % change |
| 600 | 136.2 | 145.7 | 6.98 |
| 300 | 72.2 | 80.2 | 11.08 |
| 200 | 50.8 | 56.4 | 11.02 |
| 100 | 27.6 | 32 | 15.94 |
| 6 | 3.7 | 5.8 | 56.76 |
| 3 | 2.7 | 4.5 | 66.67 |
| PV | 65.9 | 66.1 | 0.30 |
| YP | 7.5 | 13.8 | 84.00 |
| 10" | 4.2 | 7 | 66.67 |
| 10' | 9.2 | 13 | 41.30 |
| ES | 796 | 735 | −7.58 |

Figure 8:
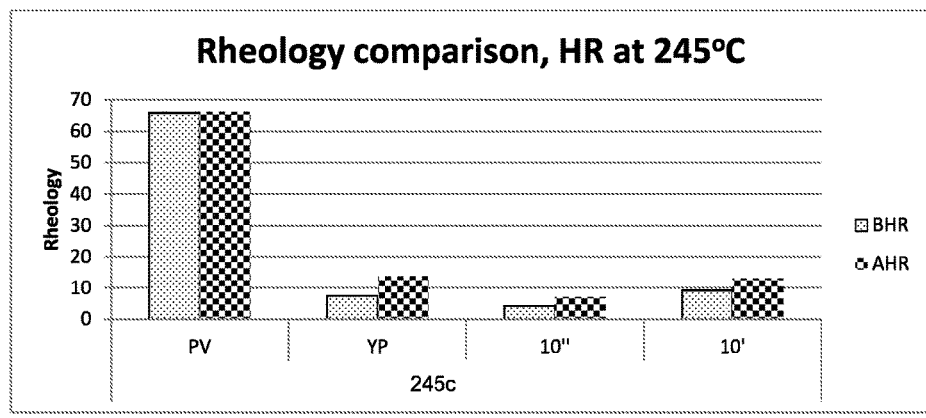
FIG. 8 is a graph, showing rheology, including plastic viscosity (PV), yield point (YP), 10" and 10' gel strength, at Before Hot Rolling (BHR) and After Hot Rolling (AHR), according to Table 5 with temperatures of 245 degrees C. and mud weight comparable to Table 1 and FIG. 2.
Figure 9:
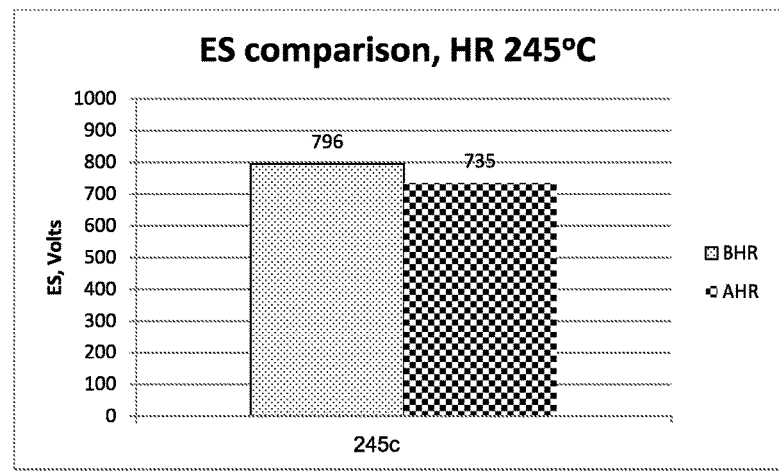
FIG. 9 is a graph, showing electrical stability, at Before Hot Rolling (BHR) and After Hot Rolling (AHR), according to Table 5 with temperatures of 245 degrees C. and mud weight comparable to Table 1 and FIG. 3.

Table 5 shows the Rheology and Electrical Stability of a drilling mud with emulsifier of the present invention aged at 245 degrees C. The rheology and electrical stability were measured before hot rolling (BHR) and after hot rolling (AHR) at 150 degrees F. The examples of Table 5 used a mud weight (MW) of 2.2. The results of rheology are graphed in FIG. 8, and the results of electrical stability are graphed in FIG. 9. FIGS. 8 and 9 further support the emulsifier of the present invention as being stable at the high temperatures, by showing change similar to Table 3. The 225 degrees C., 235 degrees C., and 245 degrees C. examples all show that the properties of the drilling fluid are stable Before Hot Rolling treatment and After Hot Rolling treatment at the elevated temperatures and higher densities.

Referring to FIGS. 2-9, the present invention provides an emulsifier and an oil based drilling fluid system with the emulsifier for high density and high temperature conditions. Tables 1, 3, and 4, along with FIGS. 2, 3, 6 and 7 show the stability of the drilling fluid with the emulsifier at high density. As the mud weight increases, the emulsifier maintains rheology and electrical stability of the drilling fluid sufficient to perform the desired work in the wellbore. The results show examples of the mud weight within the range of 2.0-2.8 SG. Tables 3 and 5, along with FIGS. 6-9 establish the stability of the drilling fluid with the emulsifier at high temperatures. As the temperature increases, the emulsifier maintains rheology and electrical stability within the range of 15-260 degrees C. The viscosity and ability to suspend the dispersed phase and drill cuttings of the present invention withstand the harsher wellbore conditions at the greater depths.

Table 2, along with FIGS. 4 and 5, show the failure of prior art emulsifiers in the wellbore conditions at greater depths. Adding more prior art emulsifier cannot maintain rheology and electrical stability of the drilling fluid for work as a drilling fluid under the high temperature conditions. A different emulsifier is required. In contrast, Table 2 shows the drilling fluid with the emulsifier of the present invention. The conventional range of emulsifier in the prior art is 1-10% by weight. In embodiments of the present invention, the range is 0.3-3% by weight. The emulsifier of the present invention is more effective and a lesser amount is required to be added to the drilling fluid. The present invention provides an oil based drilling fluid system for deeper wells with wellbore conditions that require high density drilling fluids in high temperature conditions with lesser amounts of emulsifier.

Conventional emulsifiers contain nitrogen containing compounds, derived from fatty acids. Attempts to modify the conventional emulsifiers abandon nitrogen for the drilling fluids at the high temperature conditions of the deeper wellbores. The degradation of the nitrogen containing compounds is potentially toxic at the high temperatures. The present invention shows stability of the emulsifier with nitrogen containing compounds, derived from fatty acids. The oil based drilling fluid system having an emulsifier of a mixture of polymeric amides or polyamides withstand the high temperatures. Embodiments of the present invention include the method of manufacturing the emulsifier for the drilling fluid, including obtaining the mixture of polyamides derived from a fatty oil, diethylenetriamine, and maleic acid. The use of fatty oils, such as castor oil, can be biologically friendly and carry less risk of environmental effects.

Drilling fluids with additives are selected for the particular work to be done by the fluid and the conditions of the wellbore. For the conditions of the wellbore at greater depths, higher density drilling fluids that are stable at higher temperatures are required. The emulsifying composition, the drilling fluid with the emulsifying composition, and the method of manufacturing the emulsifier of the present invention meet the requirements for drilling operations under the deeper wellbore conditions.

The foregoing disclosure and description of the invention is illustrative and explanatory thereof. Various changes in the details of the illustrated structures, construction and method can be made without departing from the true spirit of the invention.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. An emulsifying composition for an oil based drilling fluid, comprising:
a saturated or unsaturated, monohydroxylated or polyhydroxylated, branched or straight chain alcohol;
1,3-dihydroxypropan-2-yl (E)-12-hydroxyoctadec-9-enoate as Compound A;
(9E,9'E)-N,N'-(azanediylbis(ethane-2,1-diyl))bis(12-hydroxyoctadec-9-enamide as Compound B;

(E)-12-hydroxy-N,N-bis(2-((E)-12-hydroxyoctadec-9-enamido(ethyl)octadec-9-enamide as Compound C;

(Z)-4-(bis(2-((E)-12-hydroxyoctadec-9-enamido)ethy)amino)-4-oxobut-2-enoic acid as Compound D;

1,3-dihydroxypropan-2-yl (Z)-4-(bis(2-((E)-12-hydroxyoctadec-9-enamido)ethy)amino)-4-oxobut-2-enoate as Compound E; and N1,N1,N4,N4-tetrakis(2-((E)-12-hydroxyoctadec-9-enamido)ethyl)maleamide as Compound F.

2. The emulsifying composition, according to claim 1, wherein said alcohol is 10-50% by weight, said Compound A is 10-50% by weight, and said Compound B is 5-30% by weight.

3. The emulsifying composition, according to claim 2, wherein each of said Compound C, said Compound D, said Compound E, and said Compound F is 5-40% by weight.

4. The emulsifying composition, according to claim 1, wherein said alcohol is 20-30% by weight, said Compound A is 10-30% by weight, and said Compound B is 10-20% by weight.

5. The emulsifying composition, according to claim 3, wherein each of said Compound C, said Compound D, and said Compound E is 5-10% by weight, and said Compound F is 5-20% by weight.

6. The emulsifying composition, according to claim 1, being produced by reactions of a fatty oil with diethylenetriamine and then maleic acid.

7. The emulsifying composition, according to claim 1, wherein the said alcohol is C16-C24 unsaturated, a C4-C12 monohydroxylated, C8-C16 branched chain alcohol.

* * * * *